April 7, 1970  M. J. BUCKLEY ET AL  3,505,051
LOW-GLOSS ALKALI-SILICATE COATING PROCESS FOR GLASS
Filed Jan. 16, 1968
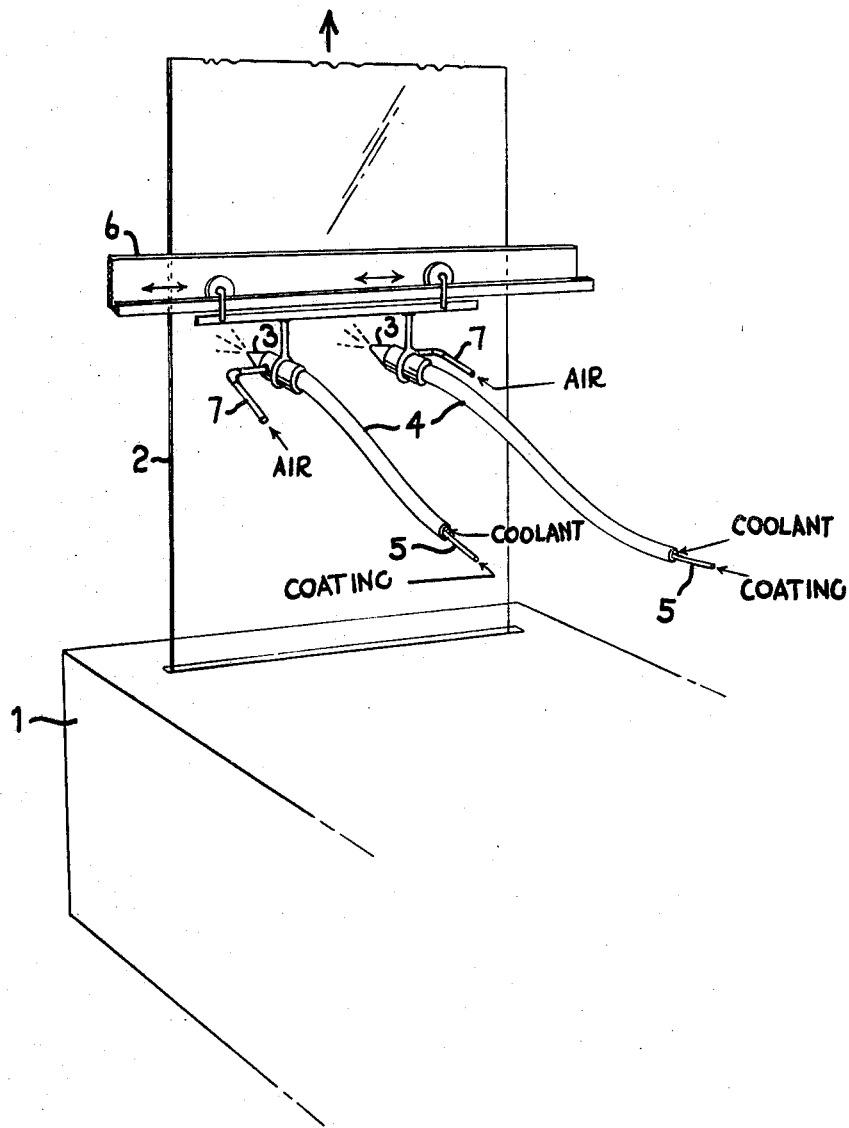
INVENTORS
MICHAEL J. BUCKLEY
ROBERT L. TILTON
BY
ATTORNEYS

United States Patent Office 3,505,051
Patented Apr. 7, 1970

3,505,051
LOW-GLOSS ALKALI-SILICATE COATING PROCESS FOR GLASS
Michael J. Buckley, Brackenridge, and Robert L. Tilton, Wexford, Pa., assignors to PPG Industries, Inc., Pittsburgh, Pa., a corporation of Pennsylvania
Filed Jan. 16, 1968, Ser. No. 698,216
Int. Cl. C03c 17/22, 25/02
U.S. Cl. 65—60                                    5 Claims

ABSTRACT OF THE DISCLOSURE

This invention pertains to an improved method of producing low-reflectance alkali silicate coatings on glass. The invention especially relates to a continuous coating process for forming non-reflective alkali-silicate coatings on a glass ribbon as it is being drawn from a molten mass of glass. More particularly, the invention pertains to contacting a glass ribbon during drawing at the place where the temperature of the ribbon is below about 500° F. and, preferably, where the ribbon temperature is between 300° F. and 400° F., although useful coatings are formed at temperatures as low as 200° F., with a sprayable aqueous sodium-silicate or potassium-silicate solution.

BACKGROUND

Many utilizations of glass require a low-reflectance surface which does not substantially interfere with the optical properties of the glass. One method of producing a low-reflectance glass surface is to etch the glass, for example, in accordance with the method disclosed in copending U.S. application Ser. No. 623,902, filed Mar. 17, 1967.

Another way of rendering a glass surface less reflective is to coat the surface with a transparent, substantially non-reflective alkali-silicate coating. Such a process is disclosed in British Patent 846,894 wherein a glass article is heated to a temperature of about 130° C. to about 420° C. (266° F. to 788° F.) and the surface of the glass contacted with an aqueous solution of potassium-silicate. A low-reflectance coating is produced upon the glass surface by this process. However, to produce a high quality coating, it is necessary to meticulously clean the surface to be coated prior to the coating operation. This is also true of the process disclosed in U.S. Patent No. 3,326,715.

INVENTION

It has now been discovered that a high-quality, low-reflectance alkali-silicate coating can be produced by contacting at a temperature of about 200° F. to about 500° F., and preferably at about 300° F. to 400° F., a ribbon of glass as it is being drawn from a molten bath of glass with an aqueous solution of an alkali-silicate.

An excellent coating of good resolution and a gloss of about 12 to about 22 as read on a 60° gloss meter is produced by the method of this invention.

Glass, as it is drawn, cools from a temperature in excess of 1300° F. for commercial glasses to a temperature approaching 100° F. before it leaves the drawing kiln. It has been found that contacting such a ribbon of glass at a temperature of between 200° F. and 500° F., and preferably at a temperature of between about 300° F. and 400° F., with a mist of an aqueous solution of alkali-silicate having a viscosity of about 1 to about 40 centipoises, and preferably a viscosity of about 1 to 20 centipoises, said viscosity being measured at 68° F. produces a good non-reflective coating. Preferred alkali-silicates have a mole ratio of $K_2O$ to $SiO_2$ and $Na_2O$ to $SiO_2$ of about 1:3.4 to about 1:4.0.

The alkali-silicate solution utilized in this invention may contain either potassium-silicate or sodium-silicate. It has been found that best results are obtaned when the hot ribbon of glass is contacted with a dilute solution of potassium or sodium silicate. Such dilute aqueous solutions generally have a $SiO_2$ content based on water of at least 3 percent by weight and preferably from about 5 percent to 8 percent by weight. It has been found that more concentrated solutions of alkali-silicate tend to produce a white or powdery coating when sprayed upon a hot ribbon at about 200° F. to about 500° F.

In order to produce a non-reflective coating of the desired gloss, the flow rate of alkali-silicate solutions must be varied with the speed of the glass ribbon. That is, the faster the ribbon is being drawn, the greater will be the alkali-silicate flow rate. However, the flow rate should generally be such that an alkali-silicate coating of about 0.15 to 0.25 gram, and preferably about 0.2 gram, of potassium-silicate or sodium-silicate is deposited per square foot of glass surface. This weight per area of potassium-silicate or sodium-silicate will yield a glass of about 12 to about 22 as read on a 60° gloss meter. A preferred gloss of about 17 is obtained at a flow rate sufficient to deposit about 0.2 gram of alkali-silicate per square foot of glass surface.

The gloss of the coating will vary somewhat with the size of droplet contained in the mist contacting the glass surface. Slight adjustment of the pressure of the atomizing air will cause a slight change in droplet size. Therefore, after adjusting the coating apparatus to obtain the proper flow rate of solution, the air pressure may be adjusted slightly to obtain optimum results. Such an adjustment is easily accomplished since trial coatings can be produced at various air pressures within the range specified hereinabove and visually checked to determine optimum gloss.

The preferred droplet size is between about 5 and 50 microns and is easily obtained by following the process as described hereinabove. Also, it has been found that droplet size is not so critical when the glass surface is hot, i.e., between 200° F. and 500° F., as in prior art processes wherein a cold surface is coated and later heated.

Reference may now be made to the attached figure for a better understanding of the instant invention. A glass ribbon 2 is drawn vertically from a glass tank 1. For the purposes of this invention, the glass ribbon does not necessarily have to be drawn vertically and a vertical drawing process is utilized here only for purposes of illustration since horizontal drawing processes are also commercially practiced. Also, the glass may be drawn or floated, over a molten metal such as tin, having a greater specific gravity than the glass.

Spray guns 3 are located about 6 to 12 inches, and preferably at about 8 inches, from the ribbon. One or more spray guns may be utilized and it is generally preferred to employ at least two spray guns to obtain maximum uniformity of coating. Atomizing air of 40 to 60 p.s.i. is introduced through lines 7 at the nozzle of the spray guns and exits from the nozzle through jets which cause the air to impinge upon the coating solution as it exits from an orifice located centrally in the face of the nozzle.

Coating solution is fed to the spray guns 3 through inlet lines 4 enclosed within a larger line 5 which contains a cooling fluid, for example, water or air. Because of the high temperature of the glass and the hot environment in the vicinity of the glass ribbon, it has been found especially desirable to maintain the potassium-silicate at a low temperature before it reached the spray guns. Without the use of a cooling fluid, the potassium or sodium silicate tends to deposit at the outlet of the spray guns, causing clogging. The spray guns reciprocate on a support 6 at a rate of from 10 to 50 cycles per minute, and preferably, from 20 to 40 cycles per minute.

Example I

A continuous run was conducted by spraying a commercial soda-lime-silica glass ribbon as it was being drawn with a dilute alkali-silicate solution. The spraying apparatus was similar to that illustrated in the figure attached hereto. An alkali-silicate solution was prepared by mixing 3 parts of water with 1 part of Kasil #1 (Philadelphia Quartz Company). Kasil #1 has the following composition: 8.3 percent by weight $K_2O$, 20.8 percent $SiO_2$, a mole ratio of $K_2O$ to $SiO_2$ of 1:3.92 and a viscosity of 0.4 poise at 68° F.

The 90-inch wide glass ribbon was being drawn at a rate of about 3,000 square feet/hour. A solution rate of 3.3 gallons/hour was fed to four spray guns from a constant head tank containing the coating solution giving a deposit of about 0.2 gram of potassium-silicate per square foot of glass. The spray guns were placed in two sets, one set having one gun immediately above the other, with a spacing of 48.4 inches between sets. Air pressure of 50 to 60 pounds/square inch was maintained at the nozzle of each spray gun to cause atomization of the potassium-silicate solution as it exited the spray gun orifice. The spray guns were located adjacent to the ribbon at a place where the ribbon temperature was about 350° F. Each gun was adjusted so that its spray covered the maximum area possible and a reciprocation rate of 26 cycles/minute was maintained.

The resulting coated glass had a gloss of 17 as measured by a 60° gloss meter. The coating was smooth, adherent, durable, and possessed an acid resistance superior to coatings developed according to the teaching of British Patent 846,894 or U.S. Patent 3,326,715.

Similar results are obtained whenever sodium-silicate is substituted for potassium-silicate in the above example.

We claim:
1. A method of producing a low-gloss alkali-silicate coating on a glass ribbon as it is being drawn from a molten mass of glass comprising
   (a) immediately thereafter contacting the ribbon at a ribbon temperature of about 200° F. to about 500° F.,
   (b) with an aqueous solution of an alkali-silicate having an $SiO_2$ content of about 3 to 8 percent by weight and sprayed at a solution rate sufficient to produce a coating of about 0.15 to about 0.25 gram of alkali-silicate coating per square foot of glass ribbon, and
   (c) cooling the glass to room temperature.
2. The method of claim 1 wherein the ribbon temperature is about 300° F. to about 400° F.
3. The method of claim 1 wherein the aqueous solution of an alkali-silicate has a viscosity of about 1 to about 40 centipoises at 68° F.
4. The method of claim 3 wherein the alkali-silicate is potassium-silicate having a ratio of $K_2O$ to $SiO_2$ of about 1:3.4 to 1:4.0.
5. The method of claim 3 wherein the alkali-silicate is sodium-silicate having a ratio of $Na_2O$ to $SiO_2$ of about 1:3.4 to 1:4.0.

References Cited

UNITED STATES PATENTS

| | | | |
|---|---|---|---|
| 2,758,038 | 8/1956 | Lentz | 65—60 |
| 3,222,197 | 12/1965 | Sibert | 65—60 |
| 3,326,715 | 6/1967 | Twells. | |

S. LEON BASHORE, Primary Examiner

J. H. HARMAN, Assistant Examiner

U.S Cl. X.R.

117—124